May 4, 1943. H. O. EIANE 2,318,474
RADIAL CONNECTING ROD
Filed March 8, 1941
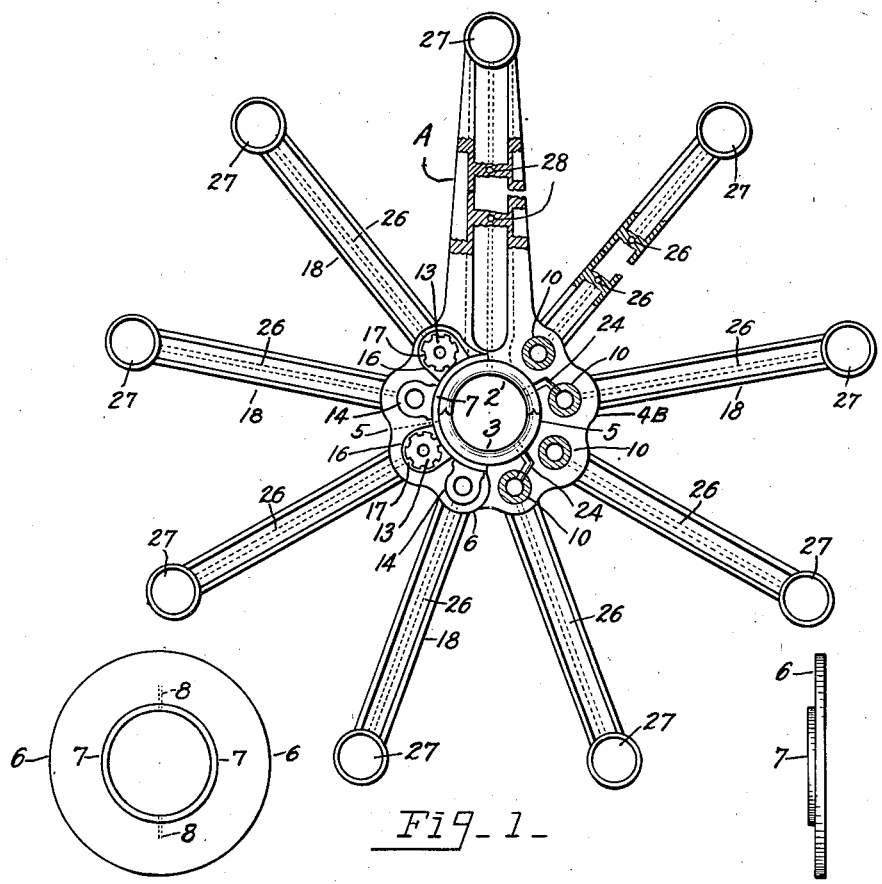
Fig-1-
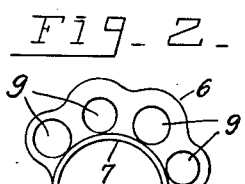
Fig-2-
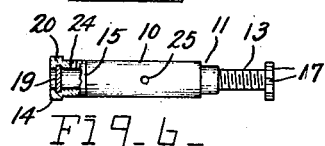
Fig-5-
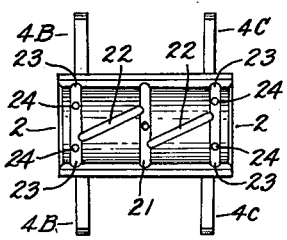
Fig-4-
Fig-7-
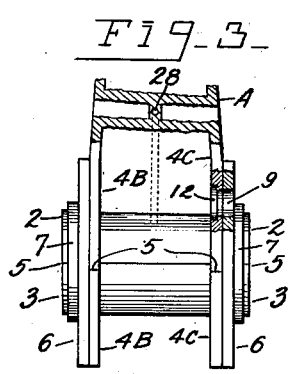
Fig-3-
Fig-8-
Witnesses:
Geo Jorgenson
Arthur Wickman
INVENTOR.
Halvor Olsen Eiane Patented May 4, 1943

2,318,474

UNITED STATES PATENT OFFICE 2,318,474

RADIAL CONNECTING ROD

Halvor Olsen Eiane, Washington Island, Wis.

Application March 8, 1941, Serial No. 382,427

2 Claims. (Cl. 74—580)

My invention relates to improvements in Radial connecting rods and particularly to applicant's earlier invention, Patent No. 1,822,694, Sept. 8, 1931, bearing the same title, in which crank-pin bearing halves are joined together by means of special joining plates fitted against circumferential ridges on the outside of the bearing halves through which articulate bolts serve a dual purpose.

The objects of the present invention are: First, to simplify and facilitate manufacturing of the invention; second, to so construct joining plates as to give bearing halves a constant clamping pressure against each other; third, to provide means for distributing lubricating oil to all bearing contact points.

I attain these objects by the use of an invention hereinafter more fully described and claimed, having reference to the accompanying drawing in which Fig. 1 is a front view of the whole connecting rod assembly except one joining plate being removed to show method of providing oil-ducts, also appearing in the same view are sectional cuts to show cross-sections of master and articulating rods.

Fig. 2 is a flat side view of a flange, as first used in the making of the joining plates.

Fig. 3 is an edge view of the flange shown in Fig. 2.

Fig. 4 represents an inside view of a crank-pin bearing half.

Fig. 5 represents a front view of a completed joining plate.

Fig. 6 is a side view of an articulate bolt and cap-screw, shown in partly longitudinal section.

Fig. 7 represents a front view of a scoop-shaped lock washer, for use with the cap-screws shown in Fig. 6.

Fig. 8 is a side view of the lower end of the master connecting rod, showing the two crank-pin bearing halves as being held together by the joining plates in the form of circular flanges, during the process of manufacture and prior to being sawed into separate halves, also shown, in broken section is a shouldered hole passing through a circumferential ridge and a joining plate, for reception of an articulate bolt.

Similar numerals refer to similar parts throughout the several views.

A, in Fig. 1, is the master connecting rod. 2 is the upper half of the crank-pin bearing. 3 is the lower half of the bearing. 4B and 4C are the circumferential ridges which girdle the two bearing halves 2 and 3 and merge in their upper portions with the ribbed structure of the master connecting rod A, of which the upper half of the two ridges form an integral part, as does also the lower half of the ridges form integral parts of the bearing half 3.

As clamping pressure between the bearing halves 2 and 3 is one of the chief objectives of this invention, the object thereof can only be attained through the processes and methods of manufacture which are as follows: First, the master connecting rod A, and the lower bearing half 3, as rough drop-forgings, preferably of high grade alloy steel, are carefully milled to form the dividing lines 5, indicated in Figs. 1 and 8; next, the two bearing halves 2 and 3 are adjusted to correct position with respect to each other and clamped tight together with a special clamp like a wire-rope clamp, but long enough to embrace the whole length of the master rod A, and while thus gripped together, the rod A, can be placed in a lathe chuck and trued up both inside and outside up to and including facing of the circumferential ridges 4B and 4C. At this stage of its manufacturing progress, the joining plates 6, still in the forms of two circular flanges with annular rib extensions 7 around their center openings, are sawed about one third through along a dead center line from diametrically opposite points on their inside, as indicated by dotted lines 8, in Fig. 2, so as to provide a certain degree of "give" and allow the flanges 6, whose inside diameters are slightly less than the outside diameters of the round formed portions of the bearing halves 2 and 3 to be forced by the aid of a screw or hydraulic press until they bear against the circumferential ridges 4B and 4C, as shown in Fig. 8. Care must be taken to see that the initial cuts as indicated by dotted lines 8, are placed in position to correspond with the longitudinal center line of the master connecting rod A.

While the two bearing halves 2 and 3 are thus held together in the tight grips of the two circular flanges 6, the remaining milling operations between the two circumferential ridges 4B and 4C can be performed and the holes 9 drilled and reamed out to proper dimensions through both ridges including the circular flanges 6, in parallel relation to the axis of the bearing halves 2 and 3, for reception of the articulate bolts 10. After removal of surplus metal at the outer edges of the circumferential ridges 4B and 4C and the circular flanges 6, the several parts are then marked so that they can be dismounted and re-assembled in their same relative positions.

At this stage of manufacturing progress, the circular flanges 6 are cut with a fine circular saw to meet the initial cuts 8, and thus from each circular flange 6 emerge two separate and finished joining plates 6, as shown in Fig. 5, while the clamping pressure between the two bearing halves 2 and 3 under which the holes 9 in the circumferential ridges 4B and 4C were drilled and the articulate bolts 10 fitted in, will remain unchanged during the useful life of the bearing assembly.

The articulate bolts 10, shown in Fig. 6, of which there are eight in number, are provided with shoulders 11, which bear against complementary formed internal seats or shoulders 12 in the circumferential ridges 4B and 4C, of which one is shown in Fig. 8, but so arranged that when one articulate bolt 10 has its shoulder 11 seated in the ridge 4C, the next bolt 10 will then have its shoulder 11 seated in the ridge 4B, and this order applies to all articulate bolts 10.

The object of this arrangement is to prevent the collective pressure of the cap-screws 13 from distorting the circumferential ridges 4B and 4C, and at the same time make oil-tight joints between the ridges 4B and 4C and the joining plates 6.

The articulate bolts 10, are slightly tapered from the head 14 to the line 15, and from the shoulder 11 to the end of the bolt, shown in Fig. 6, and the holes 9 passing through the circumferential ridges 4B and 4C and the joining plates 6, are complementarily reamed out to fit the bolts 10.

The bolt heads 14 are complementarily milled to fit the annular rib-extension 7 on the joining plates 6 (or more correctly called semi-annular, as applied to each individual joining plate 6 as shown in Fig. 5), and thus keep the articulate bolts 10 from turning (shown in Fig. 1).

Lock washers 16, having three sides turned up in the form of a scoop, are placed under the heads of the cap-screws 13 and bear against the rib extension 7 in the same manner as the bolt heads 14, and by pressing the up-turned sides of the lock washers 16 into the spanner notches 17, effective locking of the cap-screws 13 are thereby secured—lock washers 16 shown in Figs. 1 and 7.

The articulate bolts 10 are bored out hollow through their entire lengths in order to reduce weight and provide passage for lubricating oil to the articulating rods 18; and inside at the head 14 is a cover plate 19 which is expanded into an annular groove 20 which seals that end, while the opposite end of the bolt is closed by the cap-screw 13, shown in detail in Fig. 6 as representing all articulate bolts 10.

The lubricating system is designed to reach and distribute oil to all bearing surfaces in the radial connecting rod assembly.

Under the supposition that oil is delivered from an oil duct in a crank-pin under pressure, the oil enters first into the annular groove 21 in Fig. 4, and flows through the communicating grooves 22 into the annular grooves 23 and through the ducts 24 into the hollow parts of the articulate bolts 10, as shown in Fig. 1, from which the oil passes through the ducts 25, shown in Fig. 6, and lubricates the bearing bushings at the inner ends of the articulating rods 18 not shown, but which connect these rods through the articulate bolts 10 to the master rod A.

From the oil ducts 25, the oil flows through ducts 26 in the articulating rods 18 to lubricate the wrist-pin bearings 27, which is the limit of the present invention.

The master connecting rod A is provided with direct oil duct 28 reaching from the crank-pin bearing half 2 to the wrist-pin bearing 27.

The articulating rods 18 are practically alike at both ends, although the wrist-pin bearings 27 are somewhat larger than those connected to the master rod A.

I have not specified any particular bearing material for linings of the bearings, but intend to use the most approved kinds, such as babbitt, or silver alloy and the like.

I do not intend to limit my invention to the exact descriptions and drawing as herein given, as many changes can be made without departing from the principles involved.

Having thus described my invention, what I claim as new and desire to secure by Letters Patent is:

1. In a radial connecting rods assembly, a master connecting rod having an H-shaped cross sectional body structure with outward ribbings thereto, a wrist-pin bearing at the upper end of said rod, a split crank-pin bearing at the lower end of said rod, a pair of split flat faced circumferential ridges girdling said spit bearing and merging integrally above said split with said ribbings, a round concentric formed section extending axiswise from each of said circumferential ridges of said split bearing, in combination with a pair of clamp-acting semi-circular joining plates provided with inner concentric formed ribbings and seated at each end of said split bearing and embracing said round concentric formed sections and also in conformity with said ridges in arranged crossed relation to the split in said ridges and bearing, a plurality of coinciding holes extending axiswise through said joining plates and said ridges and provided with internal counterbored seats in said ridges in alternate opposite facing relation to one another, a plurality of articulate bolts provided with double seating shoulders adapted for insertion through said holes to bind together said split bearing and provide means for connections of a plurality of articulate rods to said master connecting rod.

2. In a radial connecting rods assembly, a master connecting rod having an H-shaped cross sectional body structure with outward ribbings thereto, a split crank-pin bearing of an upper half and a lower half, a pair of split flat faced circumferential ridges girdling said bearing and merging integrally in conformity with said outward ribbings in the upper portion of said upper half, a round concentric formed section of said split bearing extending axiswise from each of said circumferential ridges, in combination with a double pair of clamp-acting semi-circular flat faced joining plates provided with inner semi-circular ribbings adjusted for embracing of said concentric formed sections and in complementary junction with said circumferential ridges, a plurality of coinciding axiswise holes through said joining plates and circumferential ridges and each hole provided with an inner counterbored seat in alternate opposite facing relation to one another, a plurality of articulate bolts provided with head and body shoulders adapted for simultaneous seating against the outside of said joining plates and said inner counterbored seats in alternate opposite facing relation to one another, a complementarily formed head on each of said articluate bolts to bear and lock against said semi-circular ribbings, a plurality of lock washers provided with pre-crimped edges and complementarily formed to bear against said inner ribbings, a plurality of cap-screws provided with notched heads adapted to engage ends of said articulate bolts opposite to their heads and of being locked by impression of said pre-crimped edges into said notches, all substantially as shown and described.

HALVOR OLSEN EIANE.